| United States Patent [19] | [11] Patent Number: 4,649,168 |
| Kress et al. | [45] Date of Patent: Mar. 10, 1987 |

[54] PROCESS FOR THE PREPARATION OF FLAME-RESISTANT POLYCARBONATE MOULDING COMPOSITIONS CONTAINING TETRAFLUOROETHYLENE POLYMERS

[75] Inventors: Hans-Jürgen Kress; Ludwig Bottenbruch, both of Krefeld, Fed. Rep. of Germany; Mark Witman, Pittsburgh, Pa.; Klaus Kircher, Leverkusen, Fed. Rep. of Germany; Christian Lindner, Cologne, Fed. Rep. of Germany; Karl-Heinz Ott, Leverkusen, Fed. Rep. of Germany

[73] Assignee: Bayer Aktiengesellschaft, Leverkusen, Fed. Rep. of Germany

[21] Appl. No.: 797,531

[22] Filed: Nov. 13, 1985

[30] Foreign Application Priority Data

Nov. 20, 1984 [DE] Fed. Rep. of Germany ....... 3442281

[51] Int. Cl.$^4$ .......................... C08K 5/53; C08L 69/00
[52] U.S. Cl. .................................... 524/130; 524/132; 524/165; 524/166; 524/405; 524/413; 524/415; 524/417; 524/437; 524/438; 524/508; 525/67

[58] Field of Search ................. 525/67; 524/501, 504, 524/508, 130, 132, 165, 166, 405, 415, 417, 437, 413, 438; 260/DIG. 24

[56] References Cited

U.S. PATENT DOCUMENTS

| 4,231,920 | 11/1980 | Mark et al. | 260/45.7 S |
| 4,463,130 | 7/1984 | Serini et al. | 525/67 |
| 4,473,685 | 9/1984 | Mark | 525/146 |

*Primary Examiner*—Theodore E. Pertilla
*Attorney, Agent, or Firm*—Gene Harsh; Joseph C. Gil; Aron Preis

[57] ABSTRACT

The present invention relates to a process for the preparation of flame-resistant polycarbonate moulding compositions, which is characterized in that, besides the addition of alkali metal salts, there is incorporation of tetrafluoroethylene polymers as an intimate mixture with halogen-free graft polymers, these intimate mixtures being prepared by coagulation of the appropriate emulsion mixtures, and to the polycarbonate moulding compositions obtainable by the process according to the invention.

10 Claims, No Drawings

PROCESS FOR THE PREPARATION OF FLAME-RESISTANT POLYCARBONATE MOULDING COMPOSITIONS CONTAINING TETRAFLUOROETHYLENE POLYMERS

The present invention relates to a process for the preparation of flame-resistant polycarbonate moulding compositions, consisting of (a) thermoplastic, halogen-free, sulphur-free and phosphorus-free, aromatic polycarbonates,
(b) alkali metal salts of organic or inorganic acids,
(c) tetrafluoroethylene polymers with mean particle sizes from 0.05 μm to 20 μm, preferably from 0.08 μm to 10 μm, and
(d) halogen-free graft polymers comprising
   (d)(1) 5 to 90 parts by weight, preferably 30 to 80 parts by weight, of a mixture of
   (d)(1)(2) 50 to 95% by weight of styrene, α-methylstyrene, nuclear-substituted styrene, methyl methacrylate, or mixtures thereof, and
   (d)(1)(2) 50 to 5% by weight of (meth)acrylonitrile, methyl methacrylate, maleic anhydride, N-substituted maleimide, or mixtures thereof, onto
   (d)(2) 95 to 10 parts by weight, preferably 70 to 20 parts by weight, of a rubber having a glass temperature $T_G \leq 10°$ C., where component (a) is present in amounts of 86 to 99.85% by weight, preferably 93.5 to 99.36% by weight, component
(b) is present in amounts of 0.02 to 1% by weight, preferably 0.04 to 0.5% by weight, component
(c) is present in amounts of 0.05 to 5% by weight, preferably 0.1 to 1.0% by weight, and component
(d) is present in amounts of 0.08 to 8% by weight, preferably 0.5 to 5.0% by weight, and where the total of components (a)+(b)+(c)+(d) is, in each case, 100% by weight, and where the components are, after having been mixed, melt-compounded or melt-extruded at temperatures of 260° C. to 320° C. in customary units, which is characterised in that component (c) is used in the form of a coagulated mixture of emulsions of the tetrafluoroethylene polymers (c) with emulsions of the graft polymers (d), the ratio of mixing of component (c) to component (d) being between 5:95 and 40:60.

The present invention also relates to the polycarbonate moulding compositions obtainable by the process according to the invention.

It is possible additionally to add to the polycarbonate moulding compositions obtainable according to the invention, during their preparation or during their further processing to thermoplastic moulded articles, the other additives customary in polycarbonate chemistry, such as stabilisers against heat, moisture and against UV rays, release agents, dyestuffs, pigments and/or fillers, in the customary amounts.

Flame-resistant polycarbonate blends which contain, as further thermoplastics, ABS polymers, and contain, as flame retardants, besides alkali metal salts of inorganic or organic acids and polytetrafluoroethylenes also halogen compounds, are disclosed in DE-OS (German Published Specification) No. 2,918,883.

Mixtures of polycarbonates and ABS polymers which are made flame-resistant by the addition of halogenated sulphonates or sulphonates containing nitro groups are disclosed in DE-OS (German Published Specification) No. 2,903,100. Fluorinated polyolefins can be used as drip-inhibiting agents. In addition, it is also possible to use a halogenated organic compound.

In neither literature citation in incorporation of the tetrafluoroethylene polymers into the polycarbonate moulding compositions by coagulation with the ABS polymers claimed.

In respect of the difficulty of processing polytetrafluoroethylenes, additional reference may be made to French Patent Specification No. 1,412,767, and in respect of the incorporation of polytetrafluoroethylenes into thermoplastics, such as aromatic polycarbonates or polymers of unsaturated monomers, additional reference may be made to U.S. Pat. No. 3,294,871, and 3,005,795, in particular columns ¾, where precipitation and coagulation are mentioned.

In order to make polycarbonates containing tetrafluoroethylene polymers, as are also described in, for example, British Patent Specification No. 938,931, flame-resistant, it is necessary, for example, to introduce halogen into the polycarbonates (see German Patent Specification No. 2,211,826), where appropriate combined with alkaline earth metal carbonates (U.S. Pat. No. 3,651,174) or the addition of organic alkali metal or alkaline earth metal salts (see U.S. Pat. No. 4,391,935 and DE-OS (German Published Specification) 2,948,439) or of antimony oxide (see DE-OS (German Published Specification) No. 2,400,044) or the addition of inorganic alkali metal salts (see DE-OS (German Published Specification) No. 2,800,923) or the addition of alkali metal salts and the introduction of halogen into the polycarbonate (see Japanese Patent Publication No. 49-88,944 and U.S. Pat. No. 4,208,489). During the processing of moulding compositions of these types, especially during the preparation of articles having large surface areas or at high temperatures, there are deteriorations of the surface, such as waviness and streaking.

In contrast, the process according to the invention leads to flame-resistant polycarbonate moulding compositions containing polytetrafluoroethylenes, which show little or no surface streaking even at processing temperatures $\geq 300°$ C., while the flame-resistance remains good at VO in 1.6 mm thickness.

Polycarbonates suitable according to the invention as component (a) are those based on diphenols of the formula (I)

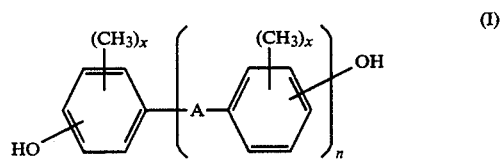

in which A is a single bond, a $C_1$–$C_5$-alkylene, a $C_2$–$C_5$-alkylidene or a $C_5$–$C_6$-cycloalkylidene, X is 0, 1 or 2 and "n" is 1 or 0.

Both homopolycarbonates and copolycarbonates are suitable polycarbonates according to the invention.

The diphenols of the formula (I) are either known from the literature or can be prepared by processes known from the literature.

The preparation of the polycarbonates suitable according to the invention as component (a) is known from the literature and can be carried out, for example, with phosgene by the phase interface process or with phosgene by the process in a homogeneous phase (the so-called pyridine process), the molecular weight which is to be set in each case being achieved in a known manner by an appropriate amount of known chain terminators.

The polycarbonates suitable according to the invention as component (a) have mean weight average molecular weights ($\overline{M}w$, measured by, for example, ultracentrifugation or nephelometry) of 10,000 to 200,000, preferably 20,000 to 80,000.

Examples of suitable diphenols of the formula (I) are hydroquinone, resorcinol, 4,4′-dihydroxydiphenyl, 2,2-bis(4-hydroxyphenyl)propane, 2,4-bis(4-hydroxyphenyl)-2-methylbutane, 1,1-bis(4-hydroxyphenyl)-cyclohexane, 2,2-bis(3-methyl-4-hydroxyphenyl)propane, 2,2-bis(3,5-dimethyl-4-hydroxyphenyl)propane, bis(3,5-dimethyl-4-hydroxyphenyl)methane and bis(4-hydroxyphenyl)methane.

Preferred diphenols of the formula (I) are 2,2-bis(4-hydroxyphenyl)propane and 1,1-bis(4-hydroxyphenyl)-cyclohexane.

The polycarbonates suitable according to the invention as component (a) can be branched in a known manner, in particular preferably by the incorporation of 0.05 to 2.0, mol-%, based on the total of diphenols used, of compounds which are trifunctional or more than trifunctional, for example those having three or more than three phenolic OH groups.

Apart from bisphenol-A homopolycarbonate, preferred polycarbonates are the copolycarbonates of bisphenol A with up to 15 mol-%, based on the total moles of diphenols, of the other abovementioned diphenols of the formula (I).

Alkali metal salts as component (b) are those of inorganic protonic acids or organic Brönsted acids having at least one carbon atom, in particular the Li, Na or K salts.

Inorganic protonic acids within the meaning of the invention are Brönsted acids which can form alkali metal or alkaline earth metal salts (in respect of the term "Brönsted acids" cf. Fieser & Fieser "Organic Chemistry", 1965, page 595, Interscience Publishers N.Y., USA), such as, for example, sulphuric acid, hydrofluoric acid, hydrochloric acid, hydrobromic acid, meta-, ortho- or pyro-phosphoric acid, and protonic acids of complex fluorine/metal compounds. The following are examples of alkali metal salts of complex fluorine/metal compounds of this type which can be used: hexafluoroaluminates, hexafluorotitanates, hexafluoroantimonates, hexafluorosilicates, hexafluorotungstates, hexafluorozirconates, hexafluorophosphates and tetrafluoroborates.

Organic Brönsted acids having at least one C atom, preferably 2 to 30 C atoms, which are able to form alkali metal salts, can be OH- or NH-acidic compounds, such as, for example, sulphonic acids, phosphonic acids, thiophosphonic acids, NH-acidic sulphonamides or sulphonimides.

Suitable alkali metal salts of organic Brönsted acids are likewise salts of the following classes of substances:

Phosphoric ester salts or phosphoric thioester salts of the general structures (II) and (III)

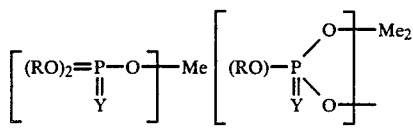

(II) Y = O, S    (III) Y = O, S with
Me=alkali metal, preferably Li, Na or K, and R=$C_1$–$C_{20}$-alkyl, cycloalkyl, $C_2$–$C_{20}$-alkenyl, cycloalkenyl, $C_6$–$C_{18}$-aryl, it being possible for the aryl radical optionally to be substituted by 1–4 halogen atoms, such as F, Cl or Br, by CN-, $CF_3$- or $C_1$–$C_{18}$-alkyl or cycloalkyl or $C_2$–$C_{18}$-alkenyl or cycloalkenyl groups.

Suitable alkali metal salts within the meaning of the invention can also be those of the general structure (IV):

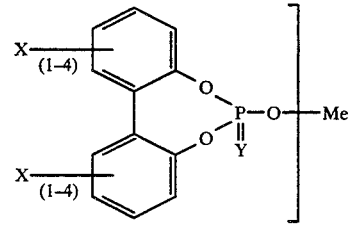

(IV) Y = O, S with
Me=alkali metal and X=F, Cl, Br, CN or $CF_3$.

Furthermore, it is possible to use alkali metal salts of the general structure (V):

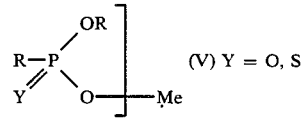

(V) Y = O, S with
Me=alkali metal, and R=R of structure (II) or (III).

The alkali metal salts as component (b) should preferably have a pH between 5 and 9, in particular between 6.5 and 7.5, measured on 1% by weight solutions or suspensions of the salts in water at 20° C.

Particularly preferred alkali metal salts as component (b) are those which contain no halogen with the exception of fluorine.

Examples of alkali metal salts of organic acids suitable according to the invention are sodium or potassium perfluorobutanesulphonate, sodium or potassium perfluoromethanesulphonate, sodium or potassium 2,5-dichlorobenzenesulphonate, sodium or potassium 2,4,5-trichlorobenzenesulphonate, sodium or potassium (4-chlorophenyl)phosphonate, sodium or potassium methylphosphonate, sodium or potassium (2-phenylethyl)-phosphonate, sodium or potassium pentachlorobenzoate, sodium or potassium 2,4,6-trichlorobenzoate, sodium or potassium 2,4-dichlorobenzoate and lithium phenylphosphonate.

Examples of alkali metal salts of inorganic acids which are suitable according to the invention are trisodium or tripotassium hexafluoroaluminate, disodium or dipotassium hexafluorotitanate, disodium or dipotassium hexafluorosilicate, disodium or dipotassium hexafluorozirconate, sodium or potassium pyrophosphate, sodium or potassium metaphosphate, sodium or potassium tetrafluoroborate, sodium or potassium hexafluorophosphate and sodium or potassium or lithium phosphate.

Mixtures of the salts with one another are likewise suitable.

Particularly suitable alkali metal salts are the sodium and potassium perfluoroalkanesulphonates, the potassium and the sodium hexafluoroaluminates, hexafluorotitanates, hexafluorosilicates and tetrafluoroborates, potassium pyrophosphate, potassium methylphosphonate and lithium phenylphosphonate.

Rubbers suitable for the preparation of the halogen-free graft polymers as component (d) are, in particular, polybutadiene, butadiene/styrene copolymers having up to 30% by weight, based on the weight of rubber, of a lower alkyl ester of acrylic or methacrylic acid (for example methyl methacrylate, ethyl acrylate, methyl acrylate or ethyl methacrylate). Examples of other suitable rubbers are polyisoprene or alkylacrylate rubbers based on $C_1$-$C_8$-alkylacrylates, in particular ethyl-, butyl- and ethyl-hexylacrylate. These alkylacrylate rubbers can, if appropriate, contain up to 30% by weight, based on the weight of rubber, of copolymerised monomers such as vinyl acetate, acrylonitrile, styrene, methyl methacrylate and/or vinyl ethers. These alkylacrylate rubbers can also contain small amounts, preferably up to 5% by weight, based on the weight of rubber, of ethylenically unsaturated monomers acting as crosslinkers. Examples of crosslinkers of this type are alkylene diol di(meth)acrylates, polyester di(meth)acrylate, divinylbenzene, trivinylbenzene, triallyl cyanurate, allyl(meth)acrylate, butadiene or isoprene. Alkylacrylates of this type are known. Acrylate rubbers as a basis for grafting can also be products which contain a crosslinked diene rubber composed of one or more conjugated dienes, such as polybutadiene, or a copolymer of a conjugated diene with an ethylenically unsaturated monomer, such as styrene and/or acrylonitrile, as the core. Examples of other suitable rubbers are EPDM rubbers, that is to say rubbers composed of ethylene, propylene and an unconjugated diene monomer.

Preferred rubbers for the preparation of the graft polymers (d) are diene monomer and alkylacrylate rubbers.

The rubbers in the graft polymers (d) are in the form of at least partially crosslinked particles of a mean particle size of 0.1 to 2 μm, in particular 0.2 to 0.6 μm. The graft polymers (d) are prepared by radical graft copolymerisation of the mixtures of monomers (d)(1)(1) and (d)(1)(2), which are defined in the introduction, in the presence of the rubbers (d)(2) which are to be grafted, and are all known. Preferred processes for the preparation of the graft polymers (d) are emulsion, solution, mass or suspension polymerisation. Particularly preferred graft polymers (d) are the so-called ABS polymers. Nuclear-substituted styrenes which may be mentioned are 2,4-dimethylstyrene and p-methylstyrene.

Since the graft polymers (d) which are to be used according to the invention are employed by first of all mixing their emulsions with emulsions of the component (c), it is most appropriate to prepare the component (d) by the process of emulsion polymerisation.

The graft polymers to be used according to the invention as component (d) are employed in the form of aqueous emulsions having particle sizes of 0.1 to 2 μm, in particular 0.2 to 0.6 μm. Emulsions of this type are known or can be prepared in a known manner from the graft polymers (d) described above, or are produced directly in the preparation of the graft polymers.

The tetrafluoroethylene polymers suitable according to the invention as component (c) are polymers having fluorine contents of 65 to 76% by weight, preferably 70 to 76% by weight. Examples are polytetrafluoroethylene, tetrafluoroethylene/hexafluoropropylene copolymers or tetrafluoroethylene copolymers with small amounts of fluorine-free copolymerisable ethylenically unsaturated monomers. The polymers are known. They can be prepared by known processes, thus, for example, by polymerisation of tetrafluoroethylene in an aqueous medium with a catalyst forming free radicals, for example sodium, potassium or ammonium peroxydisulphate, under pressures of 7 to 71 kg/cm$^2$, and at temperatures of 0° to 200° C., preferably at temperatures of 20° to 100° C. (For further details, see, for example, U.S. Pat. No. 2,393,967).

For the preparation of an appropriate mixture of components (c) and (d), first an aqueous emulsion (latex) of a graft polymer (d) with mean latex particle sizes of 0.1 to 2 μm, in particular 0.2 to 0.6 μm, is mixed with a finely divided emulsion of a tetrafluoroethylene polymer (c) in water with mean particle sizes of 0.05-20 μm, in particular 0.08-10 μm; suitable tetrafluoroethylene polymer emulsions normally have solids contents of 30-70% by weight, in particular 50-60% by weight.

The ratio by weight of graft polymer (d) to tetrafluoroethylene polymer (c) in the emulsion mixture is between 95:5 and 60:40. The emulsion mixture is then coagulated in a known manner, for example by spray-drying, freeze-drying or coagulation by means of the addition of inorganic or organic salts, acids, bases or organic solvents which are miscible with water, such as alcohols or ketones, preferably at temperatures of 20°-150° C., in particular of 50°-100° C. Where necessary, drying can be carried out at 50°-200° C., preferably 70°-100° C.

Suitable tetrafluoroethylene polymer emulsions are commercially available products and are marketed by, for example, DuPont as Teflon ®30N. In the present application, particle size always means the mean particle diameter $d_{50}$, determined by measurements in an ultracentrifuge by the method of W. Scholtan et.al., Kolloid-Z. u.Z. Polymere 250, (1972) 782-796.

The mixing of the individual constituents (a) and (b) with the mixtures of the components (c)/(d) and, where appropriate, with other additives can be carried out in a known manner either successively or simultaneously, and specifically either at 20° C. (room temperature) or at elevated temperature.

The melt extrusion or melt compounding can be carried out in, for example, known twin-shaft extruders or internal kneaders.

The moulding compositions obtainable according to the invention can be processed to moulded articles of every type, that is to say including films, in a known manner. The processing to moulded articles is carried out by, for example, known injection moulding processes, at temperatures between 270° C. and 350° C.

The moulding compositions according to the invention can be used in areas for which high flame-resistance or good non-sticking properties are required, for example in the area of electricals for switch diaphragms, plug sockets, multipoint connectors, switchboxes, telephone housing etc., in the household sector for housing parts for flat irons and coffee machines and, in particular, in the area of large equipment, for example for computer housing parts.

EXAMPLE 1

(comparison Example)

9.443 kg of a bisphenol-A homopolycarbonate having a relative solution viscosity according to the draft form of DIN 51,562, part 3, of 1.295 and a content of 0.45% by weight, based on polycarbonate and ester, of a long-chain ester composed of a long-chain carboxylic acid and a long-chain alcohol, was mixed with 100 g of Ti-O$_2$,37 g (0.39% by weight) of cryolite and 20 g (0.21% by weight) of fibril-forming ASTM TYPE 3 tetrafluoroethylene polymer, in each case based on the total weight, and the composition was compounded at a temperature of 270° C. in a 2-shaft extruder under normal conditions. After drying in a circulating air drying oven at 120° C. for 4 hours, the resulting moulding composition in the form of granules was injection moulded in an injection moulding machine at a temperature of the composition of 300° C. to give moulded articles in the form of boxes. The moulded articles showed longitudinal streaks over the entire moulded article, especially near the stalk. The same moulding composition was injection moulded to give test specimens with the dimensions 127×12.7×3.2 or 127×12.7×1.6 mm, and tests were carried out in accordance with the UL 94-V test of the Underwriter's Laboratories, Inc. The classification V-0 was reached with both wall thicknesses.

EXAMPLE 2

Polytetrafluoroethylene/graft polymer mixtures in the ratio by weight of 90:10 (Example 2a) and 72:28 (Example 2b).

2.1 Graft polymer used:

SAN graft polymer of 50% styrene/acrylonitrile mixture (in the ratio by weight of 78:28) onto 50% polybutadiene in the form of particles of a mean particle size (d$_{50}$) of 0.4 μm, obtained by emulsion polymerisation.

2.2 Tetrafluoroethylene polymer used:

A tetrafluoroethylene polymer emulsion with a mean particle size of 0.05-0.5 μm and a solids content of 60% was used.

2a/2b Preparation of the tetrafluoroethylene polymer/graft polymer mixtures:

The emulsion of the tetrafluoroethylene polymer (2.2) was mixed with the emulsion of the SAN graft polymer (2.1) and stabilised with 1.8% by weight, based on solid polymer, of phenolic antioxidants. The mixture was coagulated with an aqueous solution of MgSO$_4$ (epsom salt) and acetic acid at 85°-95° C. and pH 4-5, filtered and washed until virtually free of electrolytes, and then most of the water was removed by centrifugation and subsequently the product was dried at 100° C. to give a powder.

The ratio of tetrafluoroethylene polymer emulsion to such SAN graft polymer emulsion was selected so that the resulting mixture has, in the first case, a content of 10% by weight (Example 2a) and, in the second case, a content of 28% by weight of tetrafluoroethylene polymer (Example 2b).

EXAMPLE 3

A moulding composition was prepared as explained in Example 1, but using 200 g of a tetrafluoroethylene polymer emulsion/graft polymer emulsion coprecipitate, ratio by weight 90:10, according to Example 2a; the content of tetrafluoroethylene polymer in the moulding composition is 0.2% by weight, based on the total weight.

When injection moulded under the same conditions, items moulded in the shape of boxes at injection temperatures of 300° C. show virtually no silvery surface streaks; even at an injection moulding temperature of 330° C. (temperature of the composition), only a very few silvery surface streaks appeared, and these had no impairing effect. Normal injection moulding temperatures are around 300° C., and an injection moulding temperature of 330° C. is already unusually high so that a test at 330° C. makes any deficiencies especially clearly detectable.

A combustion test according to UL Subj. 94-V shows V-0 in the thickness of 1.6 mm as well as in that of 3.2 mm.

EXAMPLE 4

A moulding composition was prepared as explained in Example 1, but using 71.5 g of a polytetrafluoroethylene polymer emulsion/graft polymer emulsion coprecipitate, ratio by weight 72:28, according to Example 2b; the content of tetrafluoroethylene polymer in the moulding composition is 0.2% by weight, based on the total weight.

Moulded articles in the form of boxes, which were prepared from this moulding composition, showed virtually no surface defects, as in Example 3, and test specimens which were subjected to a UL Subj. 94-V test in 1.6 mm and 3.2 mm (combustion test) showed combustion classification V-0.

We claim:

1. A process for the preparation of a flame-resistant polycarbonate moulding composition, consisting of
(a) thermoplastic, halogen-free, sulphur-free and phosphorus-free polycarbonate, based on at least 1 diphenol of the formula

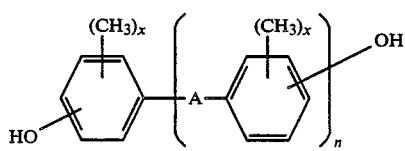

wherein A is a single bond, C$_1$–C$_5$ alkylene, C$_2$–C$_5$ alkylidene or C$_5$–C$_6$ cycloalkylidene, x is 0, 1 or 2 and n is 1 or 0,
(b) an alkali metal salt of an organic or inorganic acid,
(c) tetrafluoroethylene polymer with mean particle sizes from 0.05 μm to 20 μm, and
(d) halogen-free graft polymer comprising:
 (1) 5 to 90 parts by weight of a mixture of
  (i) 50 to 95% by weight of styrene, α-methyl-styrene, nuclear-substituted styrene, methyl methacrylate, or mixtures thereof, and (ii) 50 to 5% by weight of (meth)acrylonitrile, methyl methacrylate, maleic anhydride, N-substituted maleimide, or mixtures thereof, onto (2) 95 to 10 parts by weight of a rubber having a glass temperature $T_G \leqq 10°$ C., where the component
  (a) is present in amounts of 86 to 99.85% by weight, component
  (b) is present in amounts of 0.02 to 1% by weight, component
  (c) is present in amounts of 0.05 to 5% by weight, and component
  (d) is present in amounts of 0.08 to 8% by weight, and where the total of components (a)+(b)+(c)+(d) is, in each case, 100% by weight, in which the components (a) to (d) are, after having been mixed, melt-compounded or melt-extruded at temperatures of 260° C. to 320° C., component
  (c) being used in the form of a coagulated mixture of emulsions of the tetrafluoroethylene polymer (c) with emulsions of the graft polymer (d), the ratio of mixing of component (c) to component (d) being between 5:95 and 40:60 in each case.

2. A process according to claim 1, in which component (a) is present in an amount of 93.5 to 99.36% by weight, component (b) is present in a amount of 0.04 to 0.5% by weight, component (c) is present in an amount of 0.1 to 1.0% by weight, and component (d) is present in an amount of 0.5 to 5% by weight.

3. A process according to claim 1, in which component (a) is based on a diphenol selected from 2,2-bis(4-hydroxyphenyl)propane and 1,1-bis(4-hydroxyphenyl)-cyclohexane.

4. A process according to claim 1, in which component (b) is selected from sodium and potassium perfluoro-alkanesulphonates, potassium and sodium hexafluoroaluminates, hexafluorotitanates, hexafluorosilicates, tetrafluoroborates, potassium pyrophosphate, potassium methylphosphonate and lithium phenylphosphonate.

5. A process according to claim 1, in which the tetrafluoroethylene polymer of component (c) has mean particle sizes from 0.08 μm to 10 μm.

6. A process according to claim 1, in which component (d) comprises 30 to 80 parts by weight of the mixture of components (i) and (ii) and 70 to 20 parts by weight of the rubber.

7. A process according to claim 1, in which the emulsion of the graft polymer (d) has a mean particle size of 0.1 to 2 μm.

8. A process according to claim 7, in which the emulsion of the graft polymer (d) has a mean particle size of 0.2 to 0.6 μm.

9. A process according to claim 1, in which at least one additive selected from the group consisting of stabilisers, release agents, dye stuffs, pigments and fillers is additionally incorporated in the mixture of components (a) to (d).

10. A flame-resistant polycarbonate moulding composition produced by the process of claim 1.

* * * * *